(12) United States Patent
Hosseinian et al.

(10) Patent No.: US 11,924,846 B2
(45) Date of Patent: Mar. 5, 2024

(54) HARQ PROCESS IDENTIFICATION AND SOFT BUFFER MANAGEMENT FOR NON-TERRESTRIAL NETWORKS

(71) Applicant: Samsung Electronics Co., Ltd., Suwon-si (KR)

(72) Inventors: Seyed Mohsen Hosseinian, San Diego, CA (US); Jung Hyun Bae, San Diego, CA (US); Jungwon Lee, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 188 days.

(21) Appl. No.: 17/372,180

(22) Filed: Jul. 9, 2021

(65) Prior Publication Data

US 2022/0030560 A1   Jan. 27, 2022

Related U.S. Application Data

(60) Provisional application No. 63/090,621, filed on Oct. 12, 2020, provisional application No. 63/057,211, filed on Jul. 27, 2020.

(51) Int. Cl.
*H04W 72/04* (2023.01)
*H04L 1/18* (2023.01)
*H04L 1/1812* (2023.01)
*H04L 1/1829* (2023.01)
*H04L 5/00* (2006.01)
(Continued)

(52) U.S. Cl.
CPC ......... *H04W 72/23* (2023.01); *H04L 1/1812* (2013.01); *H04L 1/1835* (2013.01); *H04L 5/0055* (2013.01); *H04W 12/10* (2013.01); *H04W 72/0446* (2013.01)

(58) Field of Classification Search
CPC . H04W 72/23; H04W 12/10; H04W 72/0446; H04W 72/0453; H04W 72/1273; H04L 1/1812; H04L 1/1835; H04L 5/0055; H04L 1/1822; H04L 1/1887;
(Continued)

(56) References Cited

U.S. PATENT DOCUMENTS 10,880,895 B2   12/2020  Gordaychik
11,728,937 B2 *  8/2023  Joseph ............... H04L 1/1819
                                                370/329
(Continued)

OTHER PUBLICATIONS

"Enhancements on HARQ for NTN", Qualcomm Incorporated, published Aug. 7, 2020, e-Meeting, Aug. 17, 2020 through Aug. 28, 2020, 5 pages, 3GPP TSG RAN WG1 #102-e, R1-2006806.
(Continued)

*Primary Examiner* — Hoang-Chuong Q Vu
(74) *Attorney, Agent, or Firm* — Lewis Roca Rothgerber Christie LLP

(57) ABSTRACT

A hybrid automatic repeat request (HARQ) process method for nonterrestrial networks. In some embodiments, the method includes receiving, by a user equipment (UE), a first downlink control information (DCI), the first DCI including a first hybrid automatic repeat request (HARQ) process identifier (ID); calculating a first HARQ process number based on the first HARQ process ID and on a slot number associated with the first DCI; and processing a first data block via a HARQ process associated with the first HARQ process number.

18 Claims, 10 Drawing Sheets

(51) Int. Cl.
*H04W 12/10* (2021.01)
*H04W 72/23* (2023.01)
*H04W 72/0446* (2023.01)

(58) Field of Classification Search
CPC ..... H04L 5/0053; H04L 1/004; H04L 1/0058; H04L 1/1861; H04L 1/1896
See application file for complete search history.

(56) References Cited

U.S. PATENT DOCUMENTS

| | | | | |
|---|---|---|---|---|
| 2012/0300692 A1* | 11/2012 | Sfar | ............... | H04B 7/2606 370/328 |
| 2018/0278382 A1* | 9/2018 | Ji | ............... | H04L 1/1874 |
| 2020/0021402 A1* | 1/2020 | Xu | ............... | H04W 72/0446 |
| 2020/0106566 A1 | 4/2020 | Yeo et al. | | |
| 2020/0235891 A1 | 7/2020 | Lei et al. | | |
| 2020/0313806 A1* | 10/2020 | Wang | ............... | H04L 1/1822 |
| 2020/0336255 A1 | 10/2020 | Wong et al. | | |
| 2020/0337072 A1* | 10/2020 | Lunttila | ............... | H04L 5/0055 |
| 2020/0374045 A1 | 11/2020 | Yin et al. | | |
| 2021/0029641 A1 | 1/2021 | Khoshnevisan et al. | | |
| 2021/0058949 A1 | 2/2021 | Kim et al. | | |
| 2021/0092759 A1* | 3/2021 | Xiong | ............... | H04L 1/1854 |
| 2021/0204297 A1* | 7/2021 | Wu | ............... | H04L 5/0092 |
| 2021/0258104 A1* | 8/2021 | Ye | ............... | H04W 72/23 |
| 2021/0314102 A1* | 10/2021 | Li | ............... | H04L 1/1896 |
| 2021/0410155 A1* | 12/2021 | Khoshnevisan | ...... | H04L 1/1812 |
| 2022/0095351 A1* | 3/2022 | Baldemair | ............... | H04W 72/23 |
| 2022/0104187 A1* | 3/2022 | Zhou | ............... | H04L 1/1822 |
| 2022/0217749 A1* | 7/2022 | Yu | ............... | H04L 5/0094 |
| 2022/0239417 A1* | 7/2022 | Cheng | ............... | H04L 1/1835 |
| 2022/0278810 A1* | 9/2022 | Lin | ............... | H04L 5/0055 |
| 2022/0304027 A1* | 9/2022 | Yang | ............... | H04L 5/0053 |
| 2022/0386329 A1* | 12/2022 | Yu | ............... | H04L 1/1812 |
| 2023/0096133 A1* | 3/2023 | Zhou | ............... | H04W 72/53 370/329 |
| 2023/0188268 A1* | 6/2023 | Yan | ............... | H04L 1/1896 370/329 |
| 2023/0300806 A1* | 9/2023 | Haghighat | ........ | H04W 72/0446 370/329 |

OTHER PUBLICATIONS

"Summary#3 of AI 8.4.3 for HARQ for NTN", Moderator (ZTE), published Nov. 2020, e-Meeting, Oct. 26, 2020 through Nov. 13, 2020, 45 pages, 3GPP TSG RAN WG1 #103e-E, R1-2009695.

"Summary#4 of AI 8.4.3 for HARQ for NTN", Moderator (ZTE), published Feb. 2021, e-Meeting, Jan. 25, 2021 through Feb. 5, 2021, 49 pages, 3GPP TSG RAN WG1 #104e, R1-2102143.

* cited by examiner

| Maximum number of PRBs across all configured DL BWPs of a carrier for DL-SCH | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

FIG. 1

| slot number $n = 0, 4, 8, \ldots$ | $n$ | $n+1$ | $n+2$ | $n+3$ |
|---|---|---|---|---|
| HARQ Process ID | 0, 4, 8, 12, 16, 20, 24, 28, 32, 36, 40, 44, 48, 52, 56, 60 | 1, 5, 9, 13, 17, 21, 25, 29, 33, 37, 41, 45, 48, 53, 57, 61 | 2, 6, 10, 14, 18, 22, 26, 30, 34, 38, 42, 46, 50, 54, 58, 62 | 3, 7, 11, 15, 19, 23, 27, 31, 35, 39, 43, 47, 51, 55, 59, 63 |

FIG. 2F

| μ | Subcarrier spacing (kHz) |
|---|---|
| 0 | 15 |
| 1 | 30 |
| 2 | 60 |
| 3 | 120 |
| 4 | 240 |

FIG. 3

HARQ PROCESS IDENTIFICATION AND SOFT BUFFER MANAGEMENT FOR NON-TERRESTRIAL NETWORKS

CROSS-REFERENCE TO RELATED APPLICATION(S)

The present application claims priority to and the benefit of (i) U.S. Provisional Application No. 63/057,211, filed Jul. 27, 2020, entitled "METHODS FOR HARQ PROCESS IDENTIFICATION AND SOFT BUFFER MANAGEMENT FOR NON-TERRESTRIAL NETWORKS" and (ii) U.S. Provisional Application No. 63/090,621, filed Oct. 12, 2020, entitled "METHODS FOR HARQ PROCESS IDENTIFICATION AND SOFT BUFFER MANAGEMENT FOR NON-TERRESTRIAL NETWORKS", the entire content of both which is incorporated herein by reference.

FIELD

One or more aspects of embodiments according to the present disclosure relate to mobile communications, and more particularly to mobile communications involving non-terrestrial networks.

BACKGROUND

In a mobile communication system, it may on occasion be advantageous for a user equipment to communicate with a non-terrestrial node, e.g., with a communications satellite. In such a situation, the round trip delay may be significantly greater than the round trip delay between a user equipment (UE) and a terrestrial network node. This may create challenges; for example, 16 simultaneous HARQ processes may be too few to provide acceptable data throughput for some applications, and increasing the number of HARQ processes may strain the buffering capabilities of the UE.

Thus, there is a need for a system and method for HARQ process and soft buffer management for non-terrestrial networks.

SUMMARY

According to an embodiment of the present disclosure, there is provided a method, including: receiving, by a user equipment (UE), a first downlink control information (DCI), the first DCI including a first hybrid automatic repeat request (HARQ) process identifier (ID); calculating a first HARQ process number based on the first HARQ process ID and on a slot number associated with the first DCI; and processing a first data block via a HARQ process associated with the first HARQ process number.

In some embodiments, the processing of the first data block includes encoding and transmitting the first data block.

In some embodiments, the processing of the first data block includes receiving and decoding the first data block.

In some embodiments, the method further includes: determining an integrity of the first data block, and transmitting an ACK or a NACK according to the integrity of the first data block.

In some embodiments, the method further includes: receiving, by the UE, a second DCI, the second DCI including a second HARQ process ID; calculating a second HARQ process number based on the second HARQ process ID and on a slot number associated with the second DCI; determining that the second HARQ process number equals the first HARQ process number; receiving a second data block via a HARQ process associated with the second HARQ process number; and decoding the first data block with the second data block.

In some embodiments, the calculating of the first HARQ process number includes: resetting an $N_c$ bit counter at a first radio frame boundary; incrementing the $N_c$ bit counter once per slot during $K_s$ radio frames, $K_s$ being an integer greater than 0; and combining the value of the $N_c$ bit counter with the HARQ process ID to form the HARQ process number.

In some embodiments, $K_s$ is the smallest positive integer that satisfies $(K_s \cdot N_{slot}^{frame,\mu})$ MOD $2^{N_c}=0$ wherein $N_{slot}^{frame,\mu}$ is the number of slots per frame for subcarrier spacing configuration μ.

In some embodiments, calculating the first HARQ process number includes calculating the first HARQ process number according to $HARQ_{ID,\,Actual}=[(CurrentSlot\ MOD\ 2)+(HARQ_{ID,DCI}\times2)]$ MOD $N_{HARQ}$, wherein: CurrentSlot=$2^\mu \times 10 \times$ SFN+SlotNum, $$HARQ_{ID,DCI} \in \left\{0, 1, \ldots, \left\lceil \frac{N_{HARQ}}{2} \right\rceil - 1\right\}$$

is the HARQ process ID, and $N_{HARQ}$ is the number of HARQ processes supported by the UE.

In some embodiments: calculating the first HARQ process number includes combining the bits of the HARQ process ID and the one or more bits of the slot number to form the first HARQ process number, the most significant bit of the first HARQ process number is a bit of the HARQ process ID, and the least significant bit of the first HARQ process number is a bit of the HARQ process ID.

In some embodiments, the method further includes storing the first data block in a circular buffer, the circular buffer having a size $(N_{soft}-N_{soft,act})/N_{HARQ}$, wherein: $N_{HARQ}$ is a number of simultaneous HARQ processes, $N_{soft}$ is an estimate of total soft buffer sizes available within the UE for every band or band combination supported by the UE, and $N_{soft,act}$ is a soft buffer requirement for all component carriers except for NTN carriers.

In some embodiments, the method further includes storing the first data block in a soft buffer, the soft buffer being a circular buffer having a size within 20% of $$\left\lfloor \frac{\alpha \cdot TBS_{LBRM}}{C \cdot R_{LBRM}} \right\rfloor,$$

wherein:

$$\left\lfloor \frac{TBS_{LBRM}}{C \cdot R_{LBRM}} \right\rfloor$$

is a reference buffer size for use in terrestrial links; and a is equal to the ratio of 16 to the number of HARQ processes for PDSCH.

According to an embodiment of the present disclosure, there is provided a system including: a user equipment (UE), the UE including: a radio; and a processing circuit, the processing circuit being configured to: receive a first downlink control information (DCI), the first DCI including a first hybrid automatic repeat request (HARQ) process identifier (ID); calculate a first HARQ process number based on the first HARQ process ID and on a slot number associated with the first DCI; and process a first data block via a HARQ process associated with the first HARQ process number.

In some embodiments, the processing of the first data block includes encoding and transmitting the first data block.

In some embodiments, the processing of the first data block includes receiving and decoding the first data block.

In some embodiments, the system further includes: determining an integrity of the first data block, and transmitting an ACK or a NACK according to the integrity of the first data block.

In some embodiments, the processing circuit is further configured to: receive a second DCI, the second DCI including a second HARQ process ID; calculating a second HARQ process number based on the second HARQ process ID and on a slot number associated with the second DCI; determining that the second HARQ process number equals the first HARQ process number; receiving a second data block via a HARQ process associated with the second HARQ process number; and decoding the first data block with the second data block.

In some embodiments, the calculating of the first HARQ process number includes: resetting an $N_c$ bit counter at a first radio frame boundary; incrementing the $N_c$ bit counter once per slot during $K_s$ radio frames, $K_s$ being an integer greater than 0; and combining the value of the $N_c$ bit counter with the HARQ process ID to form the HARQ process number.

In some embodiments, $K_s$ is the smallest positive integer that satisfies $(K_S \cdot N_{slot}^{frame,\mu})$ MOD $2^{N_c}=0$ wherein $N_{slot}^{frame,\mu}$ is the number of slots per frame for subcarrier spacing configuration $\mu$.

According to an embodiment of the present disclosure, there is provided a system including: a user equipment (UE), the UE including: a radio; and means for processing, the means for processing being configured to: receive a first downlink control information (DCI) via a slot of a frame, the first DCI including a first hybrid automatic repeat request (HARQ) process indicator; calculate a first HARQ process number based on the first HARQ process ID and on a slot position of the first DCI in the frame; and receive and decode a first data block via a HARQ process associated with the first HARQ process number.

In some embodiments, the means for processing is further configured to: receive a second downlink control information (DCI) via a slot of a frame, the second DCI including a second HARQ process ID; calculating a second HARQ process number based on the second HARQ process ID and on a slot position of the second DCI in the frame; determining that the second HARQ process number equals the first HARQ process number; receiving a second data block via a HARQ process associated with the second HARQ process number; and decoding the first data block with the second data block.

BRIEF DESCRIPTION OF THE DRAWINGS

These and other features and advantages of the present disclosure will be appreciated and understood with reference to the specification, claims, and appended drawings wherein:

FIG. 1 is a table of values of $n_{PRB,LBRM}$, according to an embodiment of the present disclosure;

FIG. 2F is a table of HARQ ID Processes assigned to slots, according to an embodiment of the present disclosure;

FIG. 3 is a table showing subcarrier spacing index vs. subcarrier spacing, according to an embodiment of the present disclosure;

DETAILED DESCRIPTION

Figure 2A:
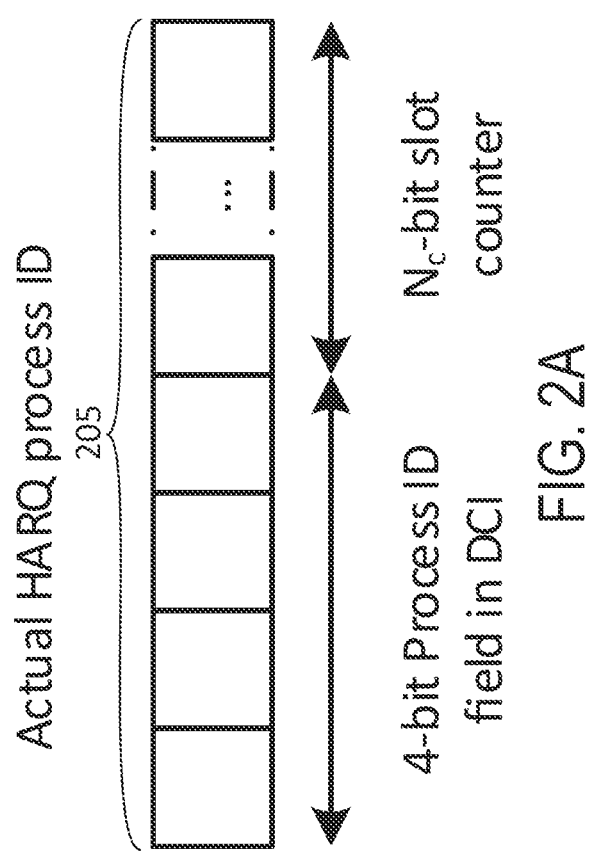
FIG. 2A is a diagram of a bit structure of a HARQ process number, according to an embodiment of the present disclosure.

The detailed description set forth below in connection with the appended drawings is intended as a description of exemplary embodiments of a system and method for HARQ process identification and soft buffer management for non-terrestrial networks provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

The roles and advantages of satellites in 5G New Radio (NR) have been studied in the 3rd Generation Partnership Project (3GPP). That effort led to the specific requirement to support satellite access that is captured in 3GPP TS 22.261 v17.1.0, "Service requirements for the 5G system; Stage 1". Therein, it is recognized that, as part of the mix of access technologies for 5G NR, satellite coverage brings added value especially for mission critical and industrial applications where ubiquitous coverage and availability is crucial.

Satellites refer to spaceborne vehicles in Low Earth Orbits (LEO), Medium Earth Orbits (MEO), Geostationary Earth Orbit (GEO), or in Highly Elliptical Orbits (HEO). Beyond satellites, Non-terrestrial networks (NTN) refer to networks or sections of networks that use airborne or spaceborne vehicles for transmission. Airborne vehicles refer to High Altitude Platform Stations (HAPS) encompassing Unmanned Aircraft Systems (UAS)—including tethered UAS, Lighter than Air UAS and Heavier than Air UAS—all operating at altitudes typically between 8 km and 50 km, and typically quasi-stationary.

As such, a 5G NR system may be equipped to provide services using satellite access, and it may support service continuity between land based 5G NR access and satellite based access networks owned by the same operator or by an agreement between different operators. To provide services using satellite access, the air interface of the 5G system may support a one-way latency of up to 300 ms, or a round-trip delay about 600 ms as specified in 3GPP TS 38.821 v16.0.0, "Solutions for NR to support non-terrestrial networks (NTN) (Release 16)".

In NR the rate matching for LDPC code is defined per coded block and consists of bit selection and bit interleaving. Soft buffer management and the number of bits may be significantly affected by the bit selection stage. Currently in NR the bit selection and soft buffer management are performed as follows.

It is assumed that the bit sequence after encoding is $d_0, d_1, \ldots, d_{N-1}$, so that N is the number of coded bits per code block. This bit sequence is the input to the bit selection block. The sequence is first written into a circular buffer of length $N_{cb}$ for the r-th code block. $N_{cb}$ is selected as:

$$N_{cb} = \min(N, N_{ref}) \qquad (1)$$

where $N_{ref}$ is defined as (with "." denoting multiplication):

$$N_{ref} = \left\lfloor \frac{TBS_{LBRM}}{C \cdot R_{LBRM}} \right\rfloor \qquad (2)$$

where $R_{LBRM}$ is the limited buffer rate matching (LBRM) default code rate value that is set to $R_{LBRM}=2/3$, and C is the number of code blocks of the transport block that is determined according to Clause 5.2.2 in 3GPP TS 38.212 v16.1.0, "Multiplexing and channel coding (Release 16)" (referred to herein as "TS 38.212"). The calculation of $TBS_{LBRM}$ is described below. If the transport block size is greater than the maximum code block size $K_{cb}$, segmentation of the input bit sequence is performed and an additional CRC sequence of L=24 bits is attached to each code block. For LDPC base graph 1, the maximum code block size is: $K_{cb}=8448$, and for LDPC base graph 2, the maximum code block size is: $K_{cb}=3840$. Therefore, C is determined according to the following equation:

$$C = \left\lceil \frac{TBS}{K_{cb} - 24} \right\rceil \qquad (3)$$

For instance, if TBS=15000 and graph 1 is used, then C=2.

$TBS_{LBRM}$ is determined according to Clause 6.1.4.2 in 3GPP TS 38.214 v16.0.0, "Physical layer procedures for data (Release 16)" (referred to herein as TS 38.214) for the uplink (UL) shared channel (UL-SCH) and Clause 5.1.3.2 in TS 38.214 for the downlink (DL) shared channel and physical channel (DL-SCH/PCH). The following discussion focuses on DL-SCH/PCH; the calculations and parameter settings for the UL-SCH are similar.

First an intermediate number of information bits, $N_{info}$, $TBS_{temp}$) is defined and obtained by:

$$N_{info} = N_{RE} \cdot R \cdot Q_m \cdot v \qquad (4)$$

In Equation (4), $N_{RE}$ is set to the maximum number of occupied resource elements (REs), i.e. $156 \times n_{PRB,LBRM}$. The value of $n_{PRB,LBRM}$ is set according to the table of FIG. 1. As may be seen in FIG. 1, the value of $n_{PRB,LBRM}$ is always quantized to a maximum value in the shown preset ranges. R is set to the maximum value of the DL-SCH coding rate, i.e., 948/1024.

For $Q_m$, if the higher layer parameter mcs-Table given by a pdsch-Config for at least one DL bandwidth part (BWP) of the serving cell is set to 'qam256', maximum modulation order $Q_m=8$ is assumed for DL-SCH; otherwise a maximum modulation order $Q_m=6$ is assumed for DL-SCH. v is the maximum number of layers for one transport block (TB) for DL-SCH/PCH and is given by the min(X, 4). If the higher layer parameter maxMIMO-Layers of PDSCH-ServingCell-Config of the serving cell is configured, X is given by that parameter. Otherwise, X is given by the maximum number of layers for the Physical Downlink Shared Channel (PDSCH) supported by the user equipment (UE) for the serving cell. As used herein, the phrase "user equipment" is used as a countable noun even though the noun it contains ("equipment") may not be countable in ordinary English. Similarly, the phrase Downlink Control Information (DCI) is also used as a countable noun.

Once the intermediate number of information bits, $N_{info}$, is calculated as above, then $TBS_{LBRM}$ is determined as follows.

First, a quantized intermediate number of information bits may be calculated:

$$N'_{info} = \max\left(3840, 2^n \cdot \text{round}\left(\frac{N_{info} - 24}{2^n}\right)\right),$$

where $n = \lfloor \log_2(N_{info} - 24) \rfloor - 5$.

If $N_{info}' > 8424$ then $TBS_{LBRM}$ is calculated as $$TBS_{LBRM} = 8 \cdot M \cdot \left\lceil \frac{N'_{info} + 24}{8 \cdot M} \right\rceil - 24,$$

where $M = \left\lceil \frac{N'_{info} + 24}{8424} \right\rceil$.

If $N_{info}' \leq 8424$ then $TBS_{LBRM}$ is calculated as $$TBS_{LBRM} = 8 \cdot \left\lceil \frac{N'_{info} + 24}{8} \right\rceil - 24.$$

Once $TBS_{LBRM}$ is calculated, then the circular buffer size, $N_{cb}$, can be calculated using equations (2) and (1).

The HARQ scheme has been adopted in most mobile communication systems since the 3rd generation (3G). In a NTN, the round-trip delay can be about 600 ms for GEO satellites to a few tens of millisecond for LEO satellites. For GEO satellites, retransmissions may not be preferred due to its very large round-trip delay (RTD), whereas for LEO satellites, HARQ can still be used with some restrictions on the number of retransmissions to ensure latency within a certain limit. In addition, the use of HARQ also depends on the type of services: for LEO satellites, it may be possible to have HARQ for regular data traffic such as web browsing; however it may not be sensible to have HARQ for most streaming services. In HARQ, a data packet that is not successfully decoded may be retransmitted, with the same HARQ process ID, and then decoded, at the receiver, with the previously received data packet. As used herein, "decoding" includes both successful and unsuccessful decoding.

In order to support high data rates in LEO satellites, the number of HARQ processes may be larger than the number of slots in a time duration as long as the RTD. For 32 ms RTD and 120 kHz subcarrier spacing (SCS), the number of HARQ processes may be as many as 256. Although it may be challenging for a UE to accommodate such a large number of concurrent HARQ processes, the typical large RTD in NTN demands support for more concurrent HARQ processes than the existing 16 processes, such that at least 32 or 64 concurrent HARQ processes are supported for NTN applications. On the other hand, it may be undesirable to further increase the number of HARQ bits in each Downlink Control Information (DCI). Therefore, there is a need for a system and method that supports more than 16 HARQ process IDs while keeping the number of HARQ bits in the DCI to the existing 4 bits.

Moreover, in some embodiments, the number of concurrent HARQ processes is increased and soft buffer management in the receive side is also modified to ensure that there is enough allocated memory in the receiver to accommodate the increased number of concurrent HARQ processes configured by the network.

In one embodiment, the HARQ process number is constructed using the HARQ process identifier (HARQ process ID) field in the DCI as well as the slot number. The 4-bit process ID field in the DCI is used as the most significant bits (MSB) and an $N_c$-bit virtual slot counter is used as least significant bits (LSB) to construct the HARQ process number 205, as shown in FIG. 2A. This way the number of supported concurrent HARQ processes may be $2^{N_c}$ times the existing 16 HARQ processes supported by the 4-bit field in the DCI. The slot counter may determine a slot number associated with the DCI. As used herein, the "slot number" of a slot is the value of the slot counter during that slot, and a "slot number associated with the DCI" is the slot number of any slot associated with the DCI; a slot associated with the DCI may be the slot containing the DCI, the first slot of a PDSCH or PUSCH scheduled by the DCI, or (if a PDSCH or PUSCH extends across a slot boundary) the last slot of a PDSCH or PUSCH scheduled by the DCI.

Figure 2B:
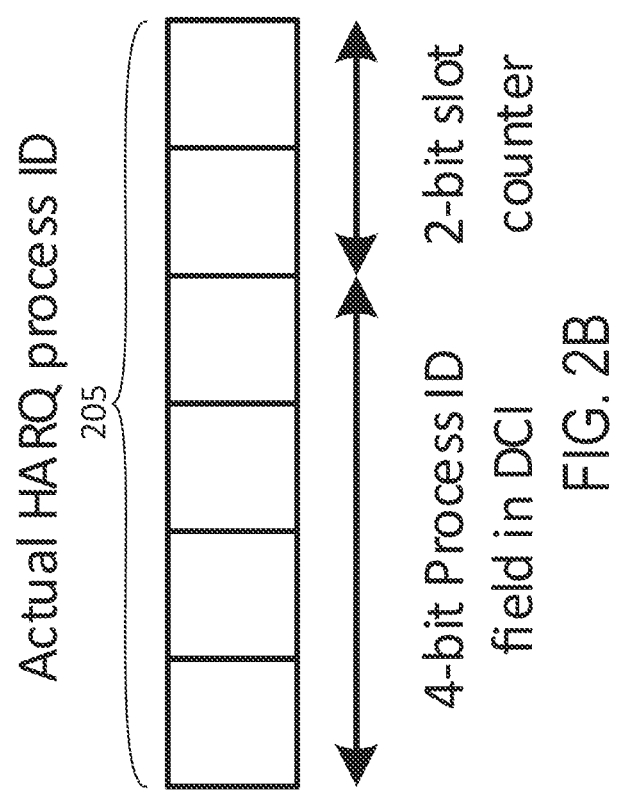
FIG. 2B is a diagram of a bit structure of a HARQ process number with a 2-bit slot counter.
Figure 2C:
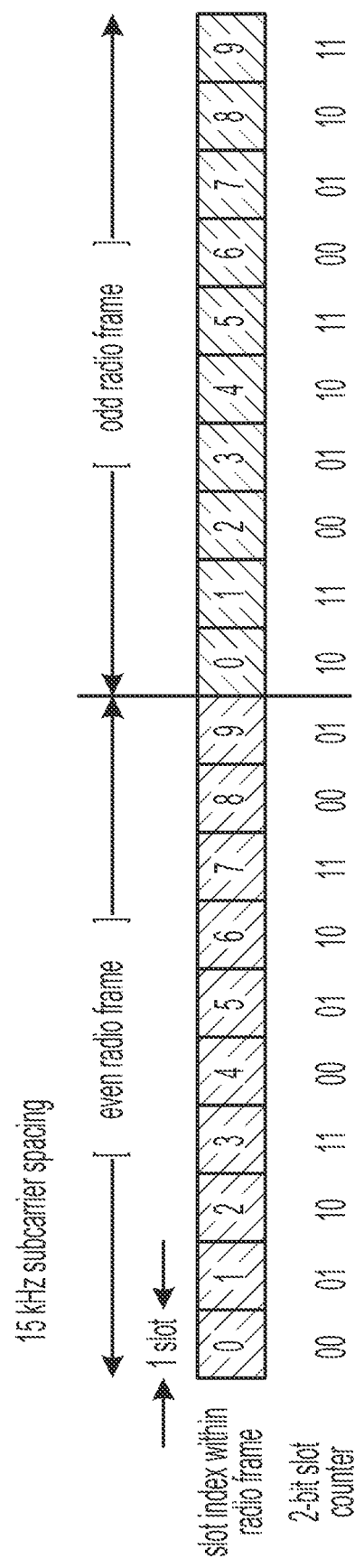
FIG. 2C is slot counter diagram, according to an embodiment of the present disclosure.

For example, if a 2-bit slot counter (FIG. 2B) is used to construct the HARQ process number 205, then 64 (=16×2^2) concurrent HARQ processes are supported. The bits of the slot counter may be appended to the right of the HARQ process ID, so that they become the least significant bits of the HARQ process number (as illustrated in FIGS. 2B and 2C), or the order in which the bits are combined may be different, with, e.g., the bits of the slot counter being inserted into the middle of the HARQ process ID (so that the most significant bit of the HARQ process number is a bit of the HARQ process ID, and the least significant bit of the HARQ process number is also a bit of the HARQ process ID).

The $N_c$-bit slot counter starts counting at the beginning of the 5G radio frame boundary. In some embodiments, the slot counter is reset (e.g., reset to zero, or reset to some other starting value) at the end of each radio frame. In other embodiments, in order to have a fair and constant distribution of HARQ process IDs over time, the $N_c$-bit slot counter is allowed to run freely until it reaches the maximum value and is reset (or resets by itself, e.g., due to overflow). In other words, the $N_c$-bit slot counter is run without being reset for $K_s$ radio frames, where $K_s$ is the smallest positive integer that satisfies the following:

$$K_s \cdot N_{slot}^{frame,\mu} \,\text{MOD}\, 2^{N_c} = 0 \tag{5}$$

where $N_{slot}^{frame,\mu}$ is the number of slots per frame for subcarrier spacing configuration $\mu$.

Figure 2D:
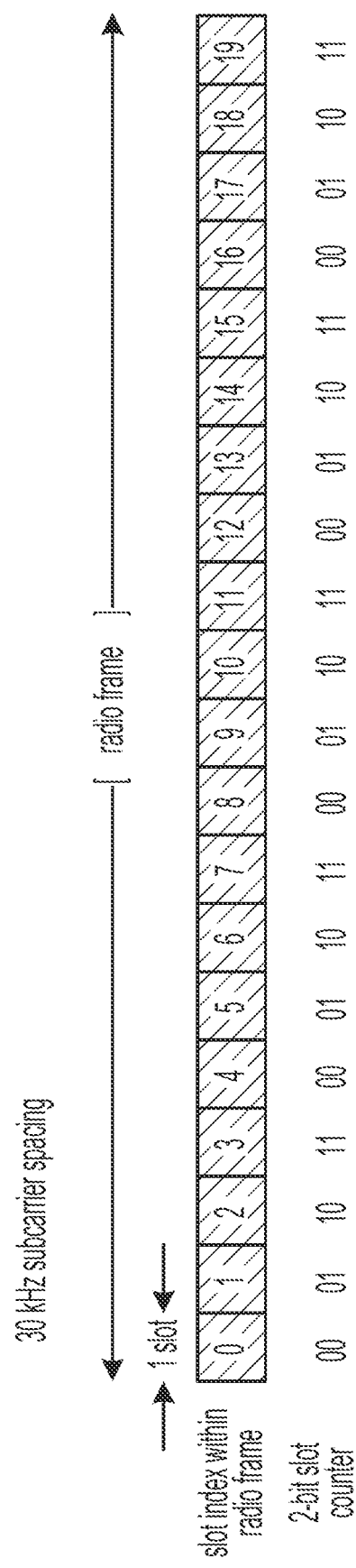
FIG. 2D is slot counter diagram, according to an embodiment of the present disclosure.
Figure 2E:
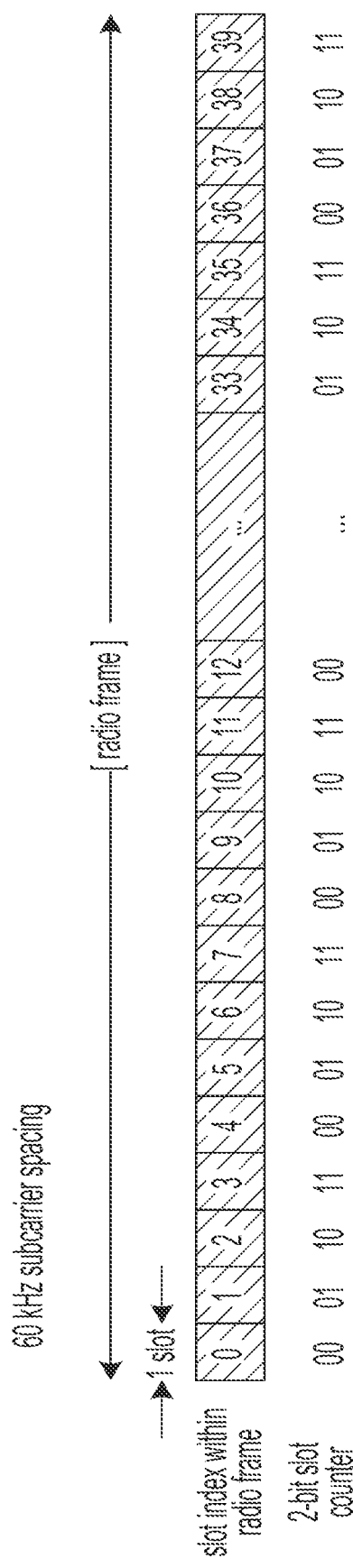
FIG. 2E is slot counter diagram, according to an embodiment of the present disclosure.

For practical cases of 5G NTN, in which there are 16 process IDs supported by a 4-bit DCI field, and only up to 32 or 64 process IDs are sought to be supported, only a 1-bit or 2-bit slot counter is needed for 32 or 64 process IDs, respectively. If that is the case, for a 1-bit slot counter, $K_s$ in Equation (5) will be always 1 for all subcarrier spacing configurations. For a 2-bit slot counter, $K_s$ will be 2 only for a subcarrier spacing of 15 kHz, i.e. $\mu=0$, as shown in FIG. 2C, and for all other subcarrier spacing configurations $K_s$ will be 1. FIG. 2D and FIG. 2E show two examples for $\mu=1$ and $\mu=2$, respectively.

In such an embodiment, the scheduler can only schedule a limited set of HARQ process IDs in a given slot. As a general rule, if an $N_c$-bit slot counter is used, a given HARQ process can be scheduled every $2^{N_c}$-th slot. For example, if a 2-bit slot counter is used, a given HARQ process ID can be scheduled every fourth slot. The table of FIG. 2F shows an example of how HARQ ID processes are distributed for scheduling opportunities among different slots with a 2-bit slot counter.

In another embodiment, up to 32 HARQ processes may be supported using only a 4-bit DCI field, with a slot-based approach as follows. If the total number of HARQ processes is expressed as $N_{HARQ}$, and the HARQ process number indicator in the DCI is expressed as $HARQ_{ID,DCI}$, then the current slot index can be expressed as:

$$\text{CurrentSlot} = 2^\mu \times 10 \times \text{SFN} + \text{SlotNum} \tag{6}$$

where $\mu$ is the sub-carrier-spacing index, SFN is the system frame number and SlotNum is the slot number in the frame. The subcarrier spacing index, $\mu$, is given for several values of the subcarrier spacing in the table of FIG. 3.

The slot-based HARQ process number, $HARQ_{ID,Actual}$, may then be expressed as the following:

$$HARQ_{ID,Actual} = [(\text{CurrentSlot MOD 2}) + (HARQ_{ID,DCI} \times 2)] \,\text{MOD}\, N_{HARQ} \tag{7}$$

where $$HARQ_{ID,DCI} \in \left\{0, 1, \ldots, \left\lceil \frac{N_{HARQ}}{2} \right\rceil - 1\right\}.$$

The above approach is defined only when the configured number of HARQ processes ($N_{HARQ}$) is greater than 16. If $N_{HARQ} \leq 16$, then the legacy NR HARQ process ID can be used, i.e., the 4-bit HARQ process ID in the DCI represents the HARQ process number.

In some embodiments, SlotNum, instead of being the slot number in the frame, is reset to 0 every 1024 frames; as such, it may count up to a number less by 1 than the number of slots in 1024 frames (e.g., to 10239 if there are 10 slots per frame) before resetting to 0. In some embodiments, SlotNum is used instead of CurrentSlot in Equation (7).

The approaches described herein apply to both uplink and downlink transmission HARQ process number identification: for example, when using DCI format 0_0 or DCI format 0_1 to provide resource allocation for the Physical Uplink Shared Channel (PUSCH), or when using DCI format 1_0 or DCI format 1_1 to provide resource allocation for the PDSCH. The approaches also apply to all types of dynamic allocation, for example when for uplink transmission a configured grant transmission switches to dynamic grant transmission.

Increasing the number of simultaneous HARQ processes may increase the burden on the UE, which may allocate soft buffer resources to each such HARQ process. In NR, the UE does not explicitly signal its maximum supported data rate. Rather, such information is calculated by the gNB using an equation specified within 3GPP TS 38.306 v16.0.0, "User Equipment (UE) radio access capabilities (Release 16)" (referred to herein as "TS 38.306"). This equation is applicable to both uplink and downlink transmissions:

$$DataRate(Mbps) = \qquad (8)$$
$$10^{-6} \sum_{j=1}^{J} \left( v_{layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

The detailed explanation of all parameters in Equation (8) may be found in Clause 4.1.2 of TS 38.306. Each individual UE capability is explicitly signaled to the gNB. For example, the UE signals its support for a specific number of downlink spatial multiplexing layers, $v_{layers}^{(j)}$, using the maxNumberMIMO-LayersPDSCH information element. Similarly, the UE signals its support for downlink modulation schemes, $Q_m^{(j)}$, using the supportedModulationOrderDL information element. The aggregated transmission bandwidth configuration and maximum number of component carriers supported by the UE may be signaled by the ca-BandwidthClassDL-NR information element. The network may respect the signaled UE radio access capability parameters when configuring the UE and when scheduling the UE.

When scheduling the UE, e.g., for downlink transmission, the PDSCH transport block considered for transmission may be segmented into multiple code blocks according to the rules shown in the discussion of rate matching above. Then the code blocks are passed to the LDPC encoder for channel coding. The output from channel coding is forwarded to the Rate Matching function. The Rate Matching function processes each channel coded segment separately. Rate matching is completed in two stages: Bit Selection and Bit Interleaving. Soft buffer management may be significantly affected by the bit selection stage. Bit Selection reduces the number of channel coded bits to match the capacity of the allocated air-interface physical resources as well as the UE memory capacity. For each code block Bit Selection forms a circular buffer and sets its size according to the rules briefly explained in in the discussion of rate matching above and in more detail in Clause 5.4.2 of TS 38.212. The network calculates the approximate maximum data rate using Equation (8) and the UE's individual reported capabilities parameters. The network assumes that the UE has sufficient memory to handle the maximum supported concurrent HARQ processes in NR, i.e., 16 HARQ processes under the supported maximum data rate as calculated above. Nevertheless, the gNB may configure the maximum number of HARQ processes for a UE in the PDSCH-ServingCellConfig RRC message through the parameter nrofHARQ-ProcessesForPDSCH, which can take values 2, 4, 6, 10, 12, and 16. If the UE is not configured, then it assumes the default value of 8 for the maximum number of HARQ processes.

In NTN the gNB may decide to configure the UE with a larger number than 16, such as 32, or even 64 or more, as the maximum number of HARQ processes. In such cases, the setting of the circular buffer size may take into account the limitation of the UE soft buffer size. In one embodiment, depending on the configured maximum number of HARQ processes a scaling factor is calculated by both the gNB and the UE and is applied to the size of the circular buffer as follows.

Bit Selection starts by writing the set of N bits belonging to the specific channel coded segment into a circular buffer. The size of the circular buffer is based on a Limited Buffer Rate Matching (LBRM) calculation. The LBRM may use a circular buffer size given by $$N_{cb} = \min(N, N_{ref}) \qquad (9)$$

where $N_{ref}$ is set as follows:
If nrofHARQ-ProcessesForPDSCH>16

$$\alpha = \frac{16}{nrofHARQ - ProcessesForPDSCH}$$

Else
$\alpha = 1$
End if $$N_{ref} = \left\lfloor \frac{\alpha \cdot TBS_{LBRM}}{C \cdot R_{LBRM}} \right\rfloor$$

where $TBS_{LBRM}$, C, and $R_{LBRM}$ are defined herein in the discussion of rate matching above, and in Clause 5.4.2 in TS 38.212. Both the gNB and the UE can calculate a independently and separately using their own information.

In some embodiments, a UE may piggyback available soft buffer capacity (e.g., if other aspects of the UE's configuration (e.g., the UE's configuration for some component carriers (CCs)) result in unused soft buffer capacity, it may make use of that unused capacity) to support $$N_{ref} = \left\lfloor \frac{TBS_{LBRM}}{C \cdot R_{LBRM}} \right\rfloor$$

without the discount factor $\alpha$, or with a discount factor $\alpha$ close to 1. As may be seen from the $N_{ref}$ calculation in Equation (2) and from the data rate calculation of Equation (8), the principal factors affecting the soft buffer size are the number of component carriers, the bandwidth, the number of layers, and the modulation order. Since a UE declares such information through UE capability signaling, it is possible for the network to implicitly calculate the total available soft buffer size of a UE.

UE capability signaling refers to the mechanism by which the UE informs the gNB of its capability to support certain features. The following is a (non-limiting) list of possible ways of reporting UE capability.

The UE can report its capability to perform certain features in any scenario. In this case, it is said that the UE reports its capability on a per-UE basis.

The UE can report its capability to perform certain features in particular bands. In this case, it is said that the UE reports its capability on a per-band basis.

The UE can report its capability to perform certain features in particular band combinations for CA. In this case, it is said that the UE reports its capability on a per-bandcombination or per-BC basis.

The UE can report its capability to perform certain features in specific band(s) in particular band combination for carrier aggregation (CA). In this case, a mechanism referred to as feature sets can be used to allow for such flexibility in reporting, and it is said that the UE reports its capability on a per-featureSet or per-FS basis in that case.

The UE can report its capability to perform certain features in specific component carrier(s) (CC) in a particular band combination for CA. In this case, a mechanism referred to as feature sets per cc can be used to allow for such flexibility in reporting, and it is said that the UE reports its capability on a per-featureSet per cc or per-FSPC basis in that case.

In the above, a band combination is a collection of bands to represent a CA configuration as described in 3GPP specification 38.101. In the list of possible ways of reporting UE capability above, the UE's flexibility for declaring support of certain features increases from the beginning of the list to the end of the list. Then, in a manner analogous to that of Equation (8), it is possible to calculate the reference soft buffer size for every band or band combination for which a UE declares support, as follows:

$$N_{soft} = 16 \; \Sigma_{j=1}^{J}(v_{layers}^{(j)} \cdot Q_m^{(j)} \cdot f^{(j)} N_{PRB}^{BW(j),\mu}(1-OH^{(j)})) \quad (10)$$

For the j-th CC, $v_{layers}^{(j)}$ is the maximum number of supported layers; layers $Q_m^{(j)}$ is the maximum supported modulation order;

$N_{PRB}^{BW(j),\mu}$ is the maximum RB allocation in bandwidth BW(j) with numerology µ, as defined in 5.3 of 3GPP TS 38.101-1 v16.3.0, "User Equipment (UE) radio transmission and reception; Part 1: Range 1 Standalone (Release 16)," and 5.3 of 3GPP TS 38.101-2 v16.4.0, "User Equipment (UE) radio transmission and reception; Part 2: Range 2 Standalone (Release 16)", where BW(j) is the maximum bandwidth supported by the UE in the given band or band combination;

$f^{(j)}$ is the scaling factor, less than 1, which can be considered to alleviate UE processing burden; and $OH^{(j)}$ is the overhead.

In Equation (10) above, 16 represents the number of HARQ processes a UE needs to support in the current spec, and $f^{(j)}$ and $OH^{(j)}$ can be removed from the equation in a certain embodiment. Equation (10) is intended to show the dependence of $N_{soft}$ on the variables shown in Equation (10); and the above $N_{soft}$ is not an absolute number of soft bits a UE needs to support; it only represents a relative quantity. Since $N_{soft}$ can be calculated for every band or band combination a UE supports, the maximum of $N_{soft}$ can also be found, and such a maximum can be considered as the reference value of soft buffer size which is called $N_{soft,max}$.

When a UE is configured with a band or band combination including a component carrier in which NTN operation occurs, it is possible to calculate the current buffer requirement for all component carriers except for NTN carriers.

$$N_{soft,act} = 16 \; \Sigma_{j=1}^{J}(v_{layers,act}^{(j)} \cdot Q_{m,act}^{(j)} \cdot f^{(j)} N_{PRB,act}^{BW(j),\mu}(1-OH^{(j)})) \quad (11)$$

For the j-th CC among J CC's in which NTN is not configured to operate:

$v_{layers}^{(j)}$ can be the same as v in the $N_{info}$ calculation of Equation (4);

$Q_m^{(j)}$ can be the same as $Q_m$ in the $N_{info}$ calculation of Equation (4);

$N_{PRB}^{BW(j),\mu}$ can be the same as $n_{PRB,LBRM}$ in the $N_{info}$ calculation of Equation (4);

$f^{(j)}$ is the scaling factor, less than 1, which can be considered to alleviate UE processing burden;

$OH^{(j)}$ is the overhead; and $f^{(j)}$ and $OH^{(j)}$ can be removed from the equation in a certain embodiment.

The amount of soft buffer available for NTN may then be calculated as $N_{soft}-N_{soft,act}$. To get the number of HARQ processes for NTN, the parameter $v_{layer,act}^{(j)} \cdot Q_{m,act}^{(j)} \cdot f^{(j)} N_{PRB,act}^{BW(j),\mu}(1-OH^{(j)})$ may be calculated for NTN; this value then represents the amount of soft buffer per HARQ process. Then, if there is only one NTN component carrier, $N_{HARQ}$, calculated according to Equation (12) below, is the number of NTN HARQ processes which can be stored without employing a discounting factor α.

$$N_{HARQ} = \left\lfloor \frac{N_{soft} - N_{soft,act}}{v_{layers,act}^{(j)} \cdot Q_{m,act}^{(j)} \cdot f^{(j)} N_{PRB,act}^{BW(j),\mu}(1-OH^{(j)})} \right\rfloor \quad (12)$$

A number of HARQ processes $N_{HARQ,\alpha}$, greater than $N_{HARQ}$ can also be stored if a discounting factor α is introduced; $N_{HARQ,\alpha}$ may be calculated as:

$$N_{HARQ,\alpha} = \left\lfloor \frac{N_{soft} - N_{soft,act}}{\alpha \cdot v_{layers,act}^{(j)} \cdot Q_{m,act}^{(j)} \cdot f^{(j)} N_{PRB,act}^{BW(j),\mu}(1-OH^{(j)})} \right\rfloor \quad (13)$$

If there are more than one NTN component carriers, the above approaches can be extended. In that case, a further distribution rule among NTN component carriers can be considered. Ultimately, a set of values of $N_{HARQ,j}$ satisfying the constraint of Equation (14) below are found for the J component carriers in which the NTN operates.

$$N_{soft}-N_{soft,act} \geq \Sigma_{j=1}^{J} N_{HARQ,j}(v_{layers,act}^{(j)} \cdot Q_{m,act}^{(j)} \cdot f^{(j)} N_{PRB,act}^{BW(j),\mu}(1-OH^{(j)})) \quad (14)$$

Due to similarity to the way $N_{info}$ is calculated in Equation (4), the aforementioned approach with Equations (10)-(14) can also be expressed using $TBS_{LBRM}$ and $R_{LBRM}$ used in Equation (2) for the $N_{ref}$ calculation.

Figure 4:
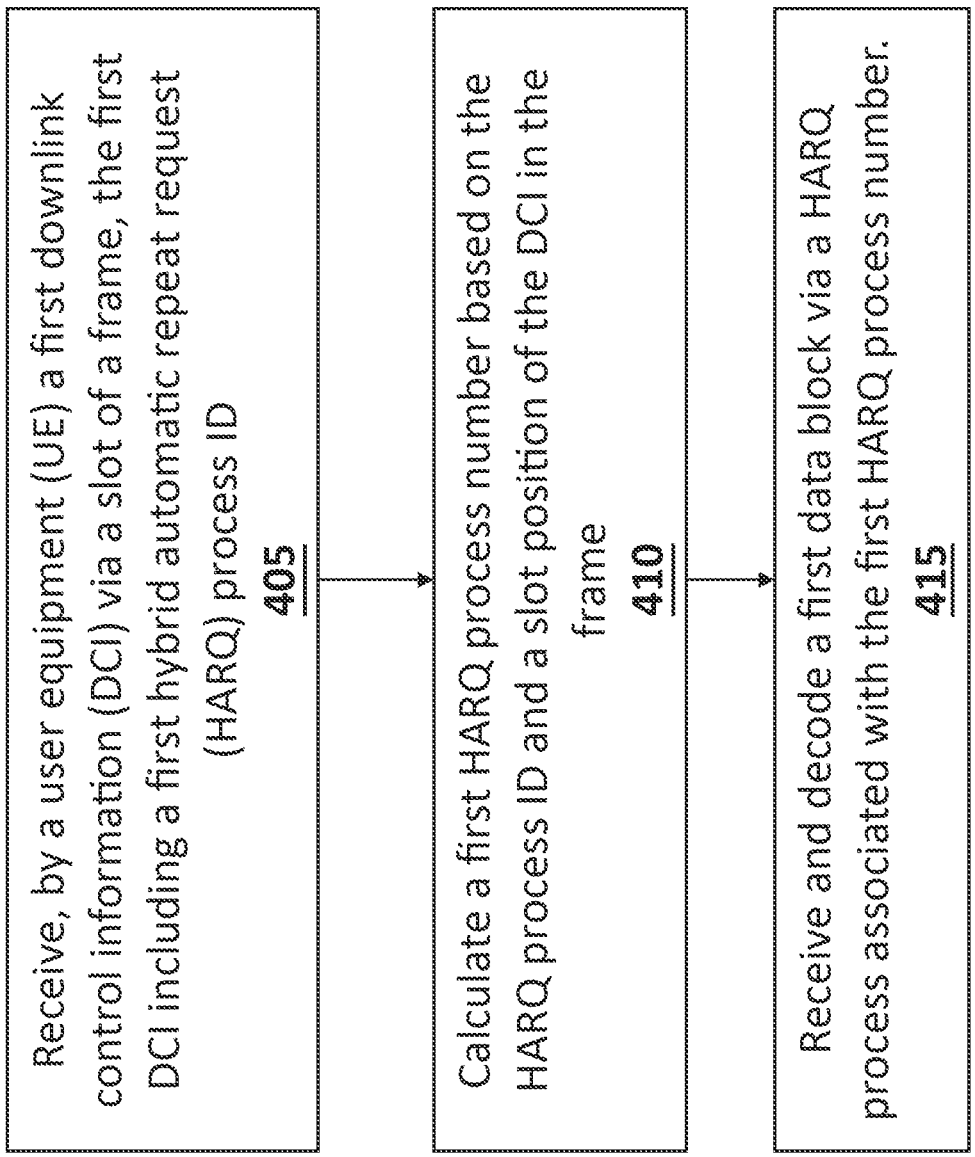
FIG. 4 is a flowchart of a method, according to an embodiment of the present disclosure.
Figure 5:
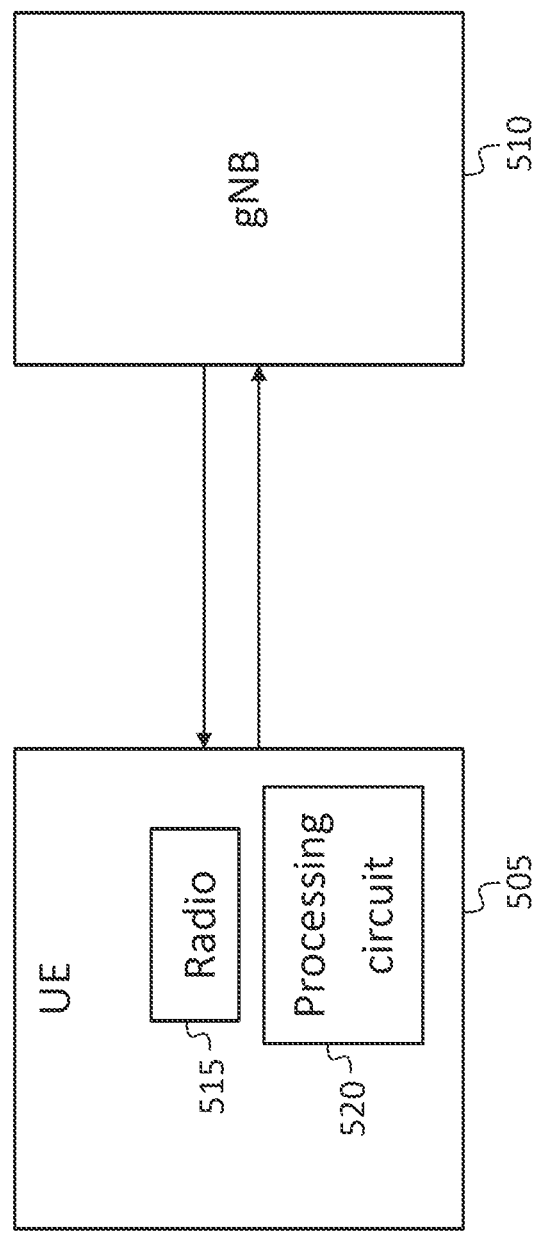
FIG. 5 is a block diagram of part of a mobile communications system, according to an embodiment of the present disclosure.

FIG. 4 shows a method, according to some embodiments. The method includes receiving, by a user equipment (UE), at 405, a first downlink control information (DCI) via a slot of a frame, the first DCI including a first hybrid automatic repeat request (HARQ) process indicator; calculating, at 410, a first HARQ process number based on the first HARQ process ID and on a slot position of the first DCI in the frame; and receiving and decoding, at 415, a first data block via a HARQ process associated with the first HARQ process number. FIG. 5 shows a system including a UE 505 and a gNB 510, in communication with each other. The UE may include a radio 515 and a processing circuit (or a means for processing) 520, which may perform various methods disclosed herein, e.g., the method illustrated in FIG. 4. For example, the processing circuit 520 may receive, via the radio 515, transmissions from the gNB 510, and the processing circuit 520 may transmit, via the radio 515, signals to the gNB 510.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. As mentioned above, a processing circuit, or means for processing, in a UE, may perform methods described herein, e.g., by transmitting messages (through a radio of the UE) or by receiving messages (through the radio of the UE), and, in some instances, by performing further processing.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for HARQ process identification and soft buffer management for non-terrestrial networks have been specifically described and illustrated herein, many modifications and variations will be apparent to those skilled in the art. Accordingly, it is to be understood that a system and method for HARQ process identification and soft buffer management for non-terrestrial networks constructed according to principles of this disclosure may be embodied other than as specifically described herein. The invention is also defined in the following claims, and equivalents thereof.

What is claimed is:

1. A method, comprising:
    receiving, by a user equipment (UE), a first downlink control information (DCI), the first DCI including a first hybrid automatic repeat request (HARQ) process identifier (ID);
    calculating a first HARQ process number based on the first HARQ process ID and on a slot number associated with the first DCI, wherein the calculating includes assigning one or more first bits of the HARQ process ID as one or more first bits of the first HARQ process number, and assigning one or more second bits of the slot number as one or more second bits of the HARQ process number; and
    processing a first data block via a HARQ process associated with the first HARQ process number.

2. The method of claim 1, wherein the processing of the first data block comprises encoding and transmitting the first data block.

3. The method of claim 1, wherein the processing of the first data block comprises receiving and decoding the first data block.

4. The method of claim 3, further comprising:
    determining an integrity of the first data block, and
    transmitting an ACK or a NACK according to the integrity of the first data block.

5. The method of claim 3, further comprising:
    receiving, by the UE, a second DCI, the second DCI including a second HARQ process ID;
    calculating a second HARQ process number based on the second HARQ process ID and on a second slot number associated with the second DCI;
    determining that the second HARQ process number equals the first HARQ process number;
    receiving a second data block via a HARQ process associated with the second HARQ process number; and
    decoding the first data block with the second data block.

6. The method of claim 1, wherein the calculating of the first HARQ process number comprises:
    resetting an $N_c$ bit counter at a first radio frame boundary;
    incrementing the $N_c$ bit counter once per slot during $K_s$ radio frames, $K_s$ being an integer greater than 0; and
    combining a value of the $N_c$ bit counter with the HARQ process ID to form the HARQ process number.

7. The method of claim 6, wherein Ks is the smallest positive integer that satisfies $$(K_S \cdot N_{slot}^{frame,\mu}) \text{MOD } 2^{N_c} = 0$$

wherein $N_{slot}^{frame,\mu}$ is the number of slots per frame for subcarrier spacing configuration μ.

8. The method of claim 1, wherein:
one or more most significant bit of the first HARQ process number is the one or more first bits of the HARQ process ID, and
one or more least significant bit of the first HARQ process number is the one or more second bits of the slot number.

9. The method of claim 1, further comprising storing the first data block in a circular buffer, the circular buffer having a size $(N_{soft} - N_{soft,act})/N_{HARQ}$,
wherein:
$N_{HARQ}$ is a number of simultaneous HARQ processes,
$N_{soft}$ is an estimate of total soft buffer sizes available within the UE for every band or band combination supported by the UE, and
$N_{soft,act}$ is a soft buffer requirement for all component carriers except for NTN carriers.

10. The method of claim 1, further comprising storing the first data block in a soft buffer, the soft buffer being a circular buffer having a size within 20% of $$\left\lfloor \frac{\alpha \cdot TBS_{LBRM}}{C \cdot R_{LBRM}} \right\rfloor,$$

wherein:

$$\left\lfloor \frac{TBS_{LBRM}}{C \cdot R_{LBRM}} \right\rfloor$$

is reference buffer size for use in terrestrial links; and
α is equal to the ratio of 16 to the number of HARQ processes for POSCH.

11. A method, comprising:
receiving, by a user equipment (UE), a first downlink control information (DCI), the first DCI including a first hybrid automatic repeat request (HARQ) process identifier (ID);
calculating a first HARQ process number based on the first HARQ process ID and on a slot number associated with the first DCI, wherein calculating the first HARQ process number comprises calculating the first HARQ process number according to $HARQ_{ID,Actual} = [(\text{CurrentSlot MOD 2}) + (HARQ_{ID,DCI} \times 2)] \text{ MOD } N_{HARQ}$,
wherein:
CurrentSlot=$2^\mu \times 10 \times$SFN+SlotNum, $$HARQ_{ID,DCI} \in \left\{ 0, 1, \ldots, \left\lceil \frac{N_{HARQ}}{2} \right\rceil - 1 \right\}$$

is the HARQ process ID, and
$N_{HARQ}$ is a number of HARQ processes supported by the UE; and
processing a first data block via a HARQ process associated with the first HARQ process number.

12. A system comprising:
a user equipment (UE), the UE comprising:
a radio; and
a processing circuit,
the processing circuit being configured to:
receive a first downlink control information (DCI), the first DCI including a first hybrid automatic repeat request (HARQ) process identifier (ID);
calculate a first HARQ process number based on the first HARQ process ID and on a slot number associated with the first DCI, wherein in calculating the first HARQ process number the processing circuit is configured to assign one or more first bits of the HARQ process ID as one or more first bits of the first HARQ process number, and assign one or more second bits of the slot number as one or more second bits of the HARQ process number; and
process a first data block via a HARQ process associated with the first HARQ process number.

13. The system of claim 12, wherein in processing the first data block, the processing circuit is configured to encode and transmit the first data block.

14. The system of claim 12, wherein in processing the first data block, the processing circuit is configured to receive and decode the first data block.

15. The system of claim 14, further comprising:
determining an integrity of the first data block, and
transmitting an ACK or a NACK according to the integrity of the first data block.

16. The system of claim 12, wherein the processing circuit is further configured to:
receive a second DCI, the second DCI including a second HARQ process ID;
calculating a second HARO process number based on the second HARQ process ID and on a second slot number associated with the second DCI;
determining that the second HARQ process number equals the first HARQ process number;
receiving a second data block via a HARQ process associated with the second HARQ process number; and
decoding the first data block with the second data block.

17. The system of claim 12, wherein the calculating of the first HARQ process number comprises:
resetting an $N_c$ bit counter at a first radio frame boundary;
incrementing the $N_c$ bit counter once per slot during $K_s$ radio frames, $K_s$ being an integer greater than 0; and
combining a value of the $N_c$ bit counter with the HARQ process ID to form the HARQ process number.

18. The system of claim 17, wherein Ks is the smallest positive integer that satisfies $$(K_S \cdot N_{slot}^{frame,\mu}) \text{MOD } 2^{N_c} = 0$$

wherein $N_{slot}^{frame,\mu}$ is a number of slots per frame for subcarrier spacing configuration μ.

* * * * *